Sept. 7, 1926.
F. E. GILMORE
BUBBLE TRAY
Filed April 11, 1925
1,598,772
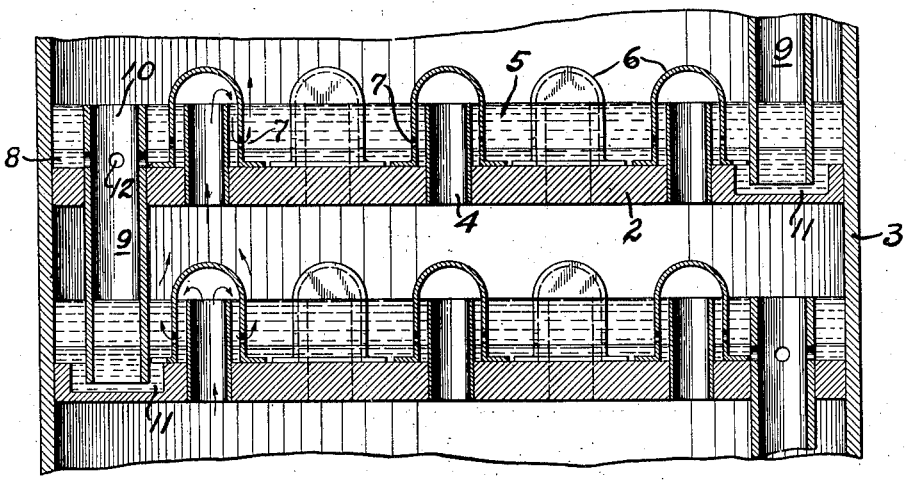
FIG.1.
FIG.2.
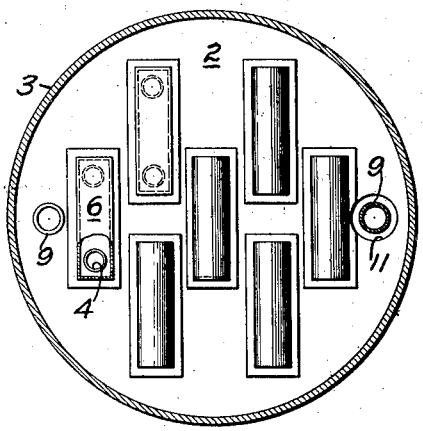
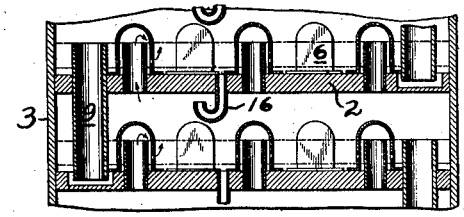
FIG.3.
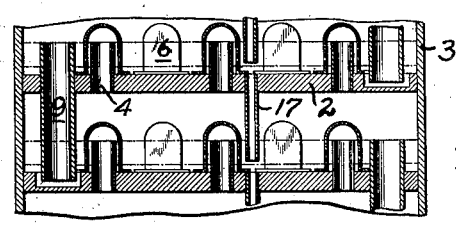
FIG.4.
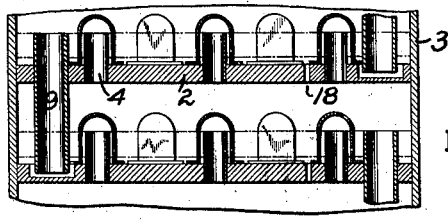
FIG.5.
INVENTOR
Forrest E. Gilmore
BY
White Prost + Evans
ATTORNEYS Patented Sept. 7, 1926.

1,598,772

UNITED STATES PATENT OFFICE.

FORREST E. GILMORE, OF LOS ANGELES, CALIFORNIA, ASSIGNOR, BY DIRECT AND MESNE ASSIGNMENTS, OF ONE-SIXTH TO FRANK AHLBURG, OF LOS ANGELES, CALIFORNIA, AND ONE-SIXTH TO WILLIAM K. WHITE, OF SAN FRANCISCO, CALIFORNIA.

BUBBLE TRAY.

Application filed April 11, 1925. Serial No. 22,429.

My invention relates to bubble trays for use in the manufacture of gasoline, and particularly to bubble trays for use in an apparatus for the stabilization of casing head gasoline. Such an apparatus is described in my co-pending application Serial #730,197 filed Aug. 25, 1924, and entitled "Method of and apparatus for making gasoline."

One of the objects of the invention is the provision of means for removing water which collects and sometimes freezes in the bubble trays. Another object of the invention is the provision of means for draining liquid from the bubble trays if operation of the process is interrupted.

Other objects of my invention together with the foregoing will be set forth in the following description of the preferred embodiment of means for practicing the same, which is illustrated in the drawings accompanying and forming part of the specification. It is to be understood that I do not limit myself to the showing made by the said description and drawings, as I may adopt variations of my preferred form within the scope of my invention as set forth in the claims.

Referring to the drawings—

Figure 1 is a vertical cross sectional view thru the center of a pair of bubble trays showing them arranged in a tower under conditions of use.

Figure 2 is a plan view of a bubble tray.

Figures 3, 4 and 5 are vertical cross sectional views, similar to that of Figure 1 and showing modified forms of my invention.

In the absorption process of obtaining gasoline from casinghead gas, described in my said co-pending application, I introduce near the bottom of a tower warm vapors containing gasoline, water and other substances. The vapors rise in the tower through a series of bubble trays placed transversely of the tower, and as the vapors ascend they are partially condensed. The condensate covers the bubble trays and collects on each of them until it has attained a certain height whereupon the liquid overflows a standpipe or weir placed in the bubble tray and discharges onto the bubble tray below. On the tray below, the liquid from above and additional condensate accumulate and then discharge through a similar weir. The process is repeated until the liquid finally reaches the bottom of the tower where it is drawn off as desired. Uncondensed portions of the rising vapor are made to pass thru the liquid accumulated on the bubble trays, each such passage thru the liquid serving to condense additional portions of condensable vapor. The remaining uncondensed vapor bubbling thru the liquid on the top tray is drawn out of the top of the tower, liquefied by compression and cooling and returned to the tower into which it is sprayed at the top. The spray exerts a pronounced cooling effect in the top of the tower due to the evaporation of a portion of the condensate. The water in the vapor rising thru the tower is also condensed on the bubble trays and, due to its greater density, forms in a stratum underlying the gasoline. The low temperature at the top of the tower, due to the spray, may occasion freezing of this water and cause trouble. Furthermore, under certain conditions it is desirable to drain the bubble trays of the accumulated liquids.

Broadly speaking therefore my invention comprises bubble trays embodying draining means so that the water may be removed from the bubble trays as it is formed thereon without preventing the maintenance of the desired depth of gasoline on the bubble trays, and such draining means is effective to allow the entire contents of the bubble trays to drain away upon a discontinuance of the process.

More particularly the bubble tray of my invention comprises a plate 2 adapted to be placed in series as partitions across the dephlegmating tower 3, only a portion of which is shown in the drawing. Each plate 2 is provided with apertures in which are mounted tubular weirs 4 flush with the bottom of the plate and extending upwardly thereon for a distance corresponding to the depth at which it is desired to have the gasoline 5 accumulate. The weirs are preferably arranged in pairs as shown in Figure 2 and each pair of weirs is completely enclosed by a hood 6 secured to the plate 2 and provided with apertures 7 adjacent the base but above the level of the stratum of water 8 which on account of its greater density will take a position below the gasoline 5.

Vapors being treated in the dephlegmating tower therefore pass thru the tubular weirs 4 as shown by the arrows in Figure 1, then downwardly thru the accumulated gasoline within the hoods 6 thru the apertures 7 and upwardly thru the accumulated gasoline to the next tray above, where the same course is repeated. It will be understood that in their passage thru the liquid in the bubble trays, the vapors give up certain condensable portions and that the liquids in the trays are being constantly added to by these condensing portions.

At one side of the bubble tray, the plate 2 is pierced by a tube 9 rising above the plate to form the tubular weir 10 of the same height as the tubes 4, and extending below the plate underneath the level of the liquid in the next lower bubble tray and preferably into the well or sump 11 formed therein. From an inspection of the drawings it will be understood that there is a tube 9, and a sump or well, on opposite sides of each tray and that in assembling the trays, the well of one is positioned under the tube 9 of the next tray above. The construction of the tube 9 does not permit the upward flow of vapors therethru, while providing a discharge passage in addition to the weirs 4 to insure against the liquid rising above the desired level.

Liquid condensing on the bubble tray separates into the upper stratum of gasoline 5 and the lower stratum of water 8, and when the liquid rises to the height of the tube 9 and the weirs 4, the gasoline overflows and empties into the next tray below, adding to its supply and causing it in turn to overflow to the next lower tray, until finally the gasoline reaches the bottom of the tower. In order to prevent accumulations of water on the trays I provide each weir 10, with a series of apertures 12 therein, just above the upper surface of the plate 2, and so that the water condensing on the bubble tray and settling into its lower stratum will flow thru the apertures 12, down thru the tube 9, and mingle with the water stratum of the next lower bubble tray, which in turn escapes in the same manner until finally the water collects in the bottom of the tower. Water is thus prevented from collecting in any considerable quantity on the bubble tray, and hence freezing of the water with its attendant difficulties is avoided. It will also be noted that if the accretion of liquid to the supply of liquid on the bubble tray is interrupted by cessation of the process, all of the liquid in the bubble tray will drain into the tube 9 through the aperture 12 and thus pass to the bottom of the tower. The size of the apertures 12 and their number in each tube 9 is such that the maintenance of the desired height of gasoline on the bubble tray is not interfered with. That is, the rate of discharge of collected water thru the apertures 12 is less than the rate of addition of liquid to the tray.

In Figure 3 I have shown a variant form of my bubble tray in which, instead of the apertures 12 in the tube 9, a tube 16 curved at the bottom to provide a trap is arranged in the plate 2, the upper end of the tube opening on the upper surface of the plate. The trapped water in the tube 16 prevents the passage of vapors thru the tube and the size of the tube is such as to limit the passage of liquid therethru so that the desired height of liquid on the bubble tray is maintained.

In Figure 4 I show still another modification of my bubble tray in which the plate 2 is provided with a tube 17 opening on the upper surface of the plate at its upper end and opening below the level of the gasoline on the next lower bubble tray. Since the lower end of the tube is submerged in the liquid on the next lower bubble tray the passage of vapor thru the tube is prevented while at the same time permitting the downward passage of the liquid.

In Figure 5 still another modification of my bubble tray is shown, in which a passage 18 is provided thru the plate 2. The downward flow of liquid thru this passage, which is relatively quite small, effectually prevents the upward passage of vapors therethru.

All three of the modified forms just explained operate in the same manner, with the exceptions noted, as the preferred structure shown in Figure 1, the structure otherwise being the same.

I claim:

1. A bubble tray adapted to accumulate liquid thereon and having a liquid overflow passage therethru, said passage opening above the tray to establish the overflow level of the accumulated liquid, and means communicating with said overflow passage for permitting liquid to drain from the upper surface of the tray.

2. A bubble tray on which liquids of different specific gravity accumulate comprising a plate, an overflow weir on the plate for permitting the lighter liquid thereon above a predetermined depth to pass thru the plate, and means for permitting the heavier liquid on the plate to pass thru the plate at a rate less than the rate of accumulation of both liquids on the tray.

3. A bubble tray on which liquids of different specific gravity accumulate comprising a plate, an overflow weir on the plate for permitting the lighter liquid thereon above a predetermined depth to pass thru the plate, means for permitting the heavier liquid on the plate to pass thru the plate at a rate less than the rate of accumulation of both liquids on the tray, and means for permitting vapors to pass thru the tray and liquid thereon.

4. A bubble tray on which liquids accumulate and stratify according to their specific gravity, a weir on said bubble tray to regulate the depth of the accumulated liquids, and means on said tray including an aperture to permit the draining of the heavier liquids accumulated thereon without disturbance of the normal level of the lighter liquids.

5. A bubble tray comprising a bottom plate having a plurality of apertures therethru, a plurality of tubes in connection with said apertures and extending above said plate substantially to the overflow level of the tray, hoods over said tubes and having apertures in the sides thereof below the overflow level, an overflow weir for permitting the discharge of the liquid at the overflow level, and means for permitting liquid to drain from the upper surface of the plate at a rate less than the rate of accumulation of liquid on the tray.

6. A bubble tray adapted to receive liquids of different densities comprising a plate on which the liquids collect, and a weir arranged in the plate for permitting the discharge thru the tray of the lighter liquid above a predetermined depth, said weir having an aperture adjacent the plate to permit the escape of the heavier liquid.

7. A bubble tray adapted to receive liquids of different densities comprising a plate on which the liquids collect, a plurality of tubular weirs arranged in the base for permitting the discharge thru the tray of the lighter liquid above a predetermined depth, one of said weirs having an aperture in the base to permit the escape of the heavier liquid, and hoods arranged over the other weirs and provided with apertures below the level of the liquid on the tray.

In testimony whereof, I have hereunto set my hand.

FORREST E. GILMORE.